United States Patent
Eckstein et al.

(10) Patent No.: US 10,254,449 B2
(45) Date of Patent: Apr. 9, 2019

(54) ELECTROMAGNETIC RADIATION-SCATTERING ELEMENT AND METHOD OF MANUFACTURING SAME

(71) Applicant: Fraunhofer-Gesellschaft zur Foerderung der angewandten Forschung E.V., Munich (DE)

(72) Inventors: Hans-Christoph Eckstein, Jena (DE); Uwe Zeitner, Weimar (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 39 days.

(21) Appl. No.: 14/770,174

(22) PCT Filed: Feb. 24, 2014

(86) PCT No.: PCT/EP2014/053543
§ 371 (c)(1),
(2) Date: Oct. 27, 2015

(87) PCT Pub. No.: WO2014/128298
PCT Pub. Date: Aug. 28, 2014

(65) Prior Publication Data
US 2016/0047951 A1    Feb. 18, 2016

(30) Foreign Application Priority Data

Feb. 25, 2013    (DE) .................. 10 2013 003 441

(51) Int. Cl.
*G02B 5/02*      (2006.01)
*G02B 5/18*      (2006.01)
(Continued)

(52) U.S. Cl.
CPC ............ *G02B 5/0221* (2013.01); *G01B 11/24* (2013.01); *G02B 5/0268* (2013.01);
(Continued)

(58) Field of Classification Search
CPC ............... G02B 5/0221; G02B 5/0284; G02B 27/0012; G02B 5/0268; G02B 5/18; G01B 11/24
(Continued)

(56) References Cited

U.S. PATENT DOCUMENTS

| | | | | |
|---|---|---|---|---|
| 2003/0214718 | A1* | 11/2003 | Kaminsky | G02B 5/0221 |
| | | | | 359/599 |
| 2006/0093809 | A1* | 5/2006 | Hebrink | B29C 55/023 |
| | | | | 428/323 |

(Continued)

FOREIGN PATENT DOCUMENTS

| | | |
|---|---|---|
| JP | 2002-341119 A | 11/2002 |
| JP | 2004-133380 A | 4/2004 |

(Continued)

OTHER PUBLICATIONS

Von Dipl.-Phs. Lars Christian Wittig, Dissertation, Dec. 9, 1973.
Ruffieux et al., "Two step process for the fabrication of diffraction limited concave microlens arrays", Optics Express, vol. 16, No. 24, Nov. 24, 2008.

*Primary Examiner* — Jade R Chwasz
*Assistant Examiner* — Rahman Abdur
(74) *Attorney, Agent, or Firm* — Jacobson Holman, PLLC.

(57) ABSTRACT

The invention relates to an electromagnetic optical element which scatters radiation in a diffuse manner. Such optical elements can be used in nearly all projection applications including front and rear projection, display applications, (cinema) screens and similar. On the surface of a claimed optical element, a surface profile is provided, the surface structure of which is non-repeating and irregular. Elevations are formed that have a height by means of which a phase (Continued)

Figure 1:
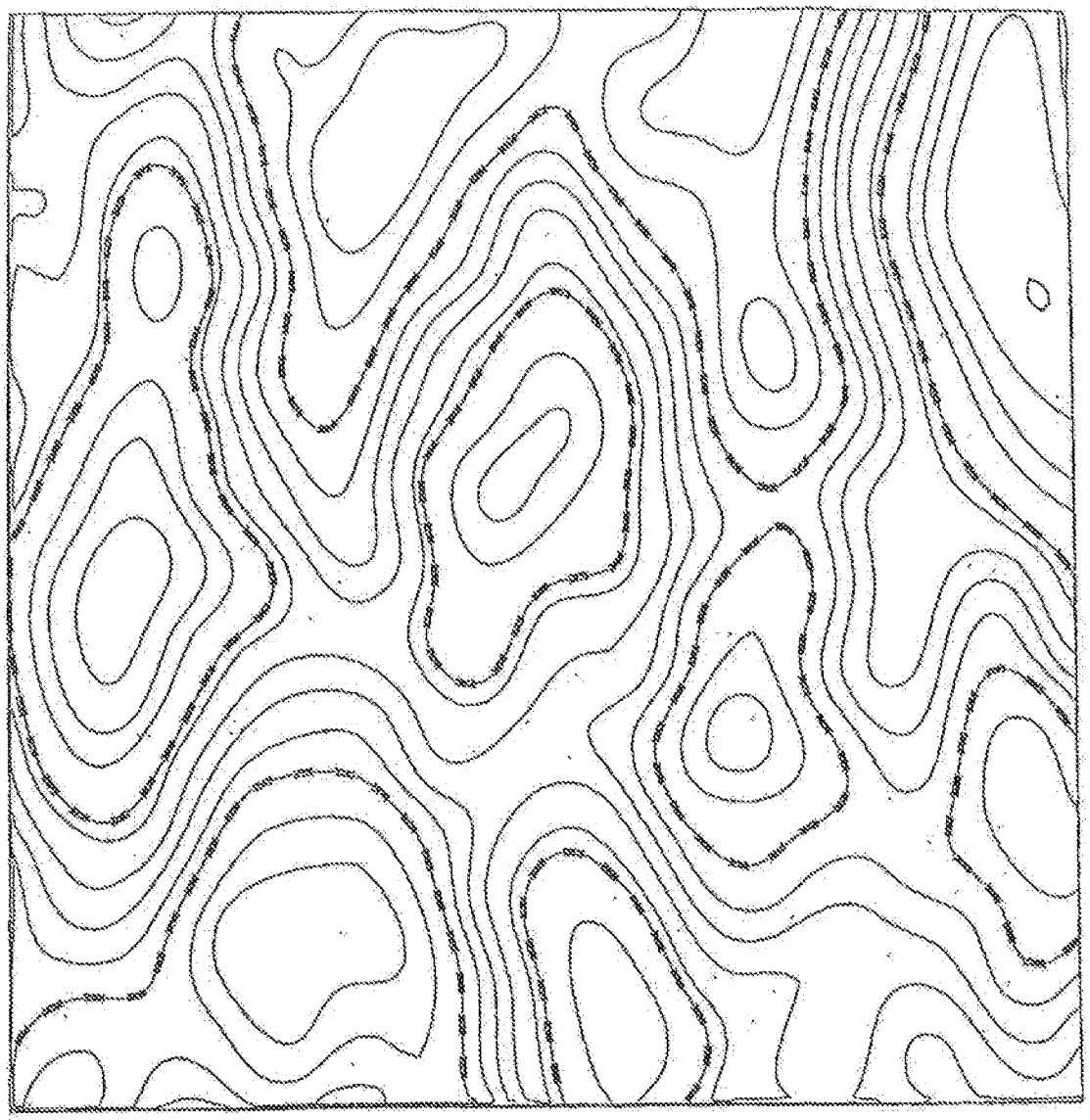

shift $\Delta\phi$ may be achieved that is greater than two and a half times the longest wavelength used, and the elevations have a lateral extension in one plane respectively, in all axial directions, that is greater than five times the longest wavelength used. The individual elevations have a continuous form in the three spatial axial directions and said elevations are devoid of edges, ledges and fissures.

14 Claims, 4 Drawing Sheets

(51) Int. Cl.
  *G01B 11/24* (2006.01)
  *G02B 27/00* (2006.01)
(52) U.S. Cl.
  CPC ............ *G02B 5/0284* (2013.01); *G02B 5/18* (2013.01); *G02B 27/0012* (2013.01)
(58) Field of Classification Search
  USPC ........................................................ 359/350
  See application file for complete search history.

(56) References Cited

U.S. PATENT DOCUMENTS

| | | | |
|---|---|---|---|
| 2006/0279679 A1 | 12/2006 | Fujisawa et al. | |
| 2008/0106793 A1 | 5/2008 | Olezak | |
| 2009/0128911 A1* | 5/2009 | Itzkovitch | ............ G02B 5/1866 |
| | | | 359/575 |
| 2010/0177398 A1 | 7/2010 | Watanabe et al. | |
| 2012/0268964 A1* | 10/2012 | Bastawros | ........... G02B 5/0221 |
| | | | 362/606 |
| 2014/0041296 A1 | 2/2014 | Ichihashi et al. | |

FOREIGN PATENT DOCUMENTS

| | | | | |
|---|---|---|---|---|
| JP | 2004-294745 A | | 10/2004 | |
| JP | 2008-224779 A | | 9/2008 | |
| JP | 2010-020337 A | | 1/2010 | |
| WO | WO2003029768 | * | 1/2003 | ......... G02B 19/0014 |
| WO | WO 03/029768 A1 | | 4/2003 | |
| WO | WO2003029768 | * | 4/2003 | ......... G02B 19/0014 |
| WO | WO 2011/149715 A1 | | 12/2011 | |

\* cited by examiner

Representation of the phase delay in an optically scattering element

ELECTROMAGNETIC RADIATION-SCATTERING ELEMENT AND METHOD OF MANUFACTURING SAME

The invention relates to an optical element which diffusely scatters electromagnetic radiation and to a method of manufacturing same. Such optical elements can be used in practically all projection applications such as front and rear projection, display applications, (cinema) screens and similar. The described structures can moreover be used for homogenizing and orienting light sources. This also opens up areas of application in general illumination, with a distribution of the luminance being able to be controlled by such a diffuser. These optical elements can furthermore be used for applications in the field of static projection and for structured illumination, for example to generate patterns, symbols, letters or logos.

Diffusers and diffusing panels are used in many microdisplay and projection applications. The image here appears on a scattering screen which can be viewed directly by the viewer or in an intermediate image plane of an optical system. It is the object of the diffuser in this respect to scatter the light from the image plane as uniformly as possible into the spatial zone in which, for example, viewers can be located. It is possible in most applications to limit this spatial zone, the so-called eye box, to a large degree. In the ideal case, the total light should in this respect be scattered into the eye box by the diffuser. With a homogeneous distribution of the luminance within the eye box with a simultaneously minimum intensity outside it, the efficiency of the projector is optimum and no brightness fluctuations occur in the case of a change of location or of the viewing angle of the viewer laterally to the projection screen.

A further important demand for these diffusers is their broadband aspect since wavelengths in the total visible spectral range are of importance in practically all projection applications and the scattering should therefore be as independent of the wavelength as possible.

Diffusers can furthermore be used to realize a specific directional characteristic such as is important in illumination applications. Specific angular distributions of the light source can thus be generated. It is possible, for example, to generate any desired intensity distribution in the far field from a collimated light source. With very high-collimation sources such as lasers, this can be used to generate images and can be used in the area of static image generation (projection of letters, logos, graphics). It is also possible to define a scattering element with spatial resolution, that is, to use laterally different scattering functions. This can be used, for example, to realize a tilting of the scatter distribution in accordance with a lens function, to collimate a light source or to compensate parallax errors with extended diffusing screens.

It is possible using diffractive optical elements to exactly define the characteristic of a scatter distribution of the electromagnetic radiation. In this respect the surface profile of a diffractive optical element is calculated by an iterative Fourier transform algorithm (IFTA). The scatter distribution can in this respect be preset almost as desired with respect to intensity and angular distribution. In practice, diffractive diffusers have, however, had practically no significance since they have a high wavelength dependence and only a limited portion of the light passes through this diffuser in a scattered manner. A portion which cannot be neglected passes unimpeded through the element and produces an interfering 0th order of diffraction which is expressed in the direct visibility of the respective light source for the viewer.

In addition, the manufacture of such elements can practically not be realized or can only be realized with a substantial effort using current technologies, especially when high angles of radiation are required.

In addition to diffractive diffusers, there is a whole number of possibilities for manufacturing optical elements in which the angular distribution or the directional characteristic can, however, not be set as desired and with spatial resolution. Mechanically roughened surfaces or surfaces roughened by laser machining, embedded small spheres whose refractive index differs greatly from the optical refractive index of the surrounding material or elements manufactured by interference lithography can be named here. It is disadvantageous in these methods or embodiments that the scatter distribution can only be preset within certain limits and that it is not possible to generate any desired intensity distributions in an eye box.

A widespread possibility for realizing scatter panels and diffusers, especially with incoherent illumination, is represented by lens arrays. Unwanted diffraction patterns result in the case of a highly collimated or spectrally narrow-band illumination due to the periodic or regular structures which occur in a lens array. Due to the technology, the fill factor of lens arrays can typically not be realized at any desired level. So-called dead zones between the lenses then have the effect that the light passes through the diffuser without scatter (similar to the 0th order of diffraction with diffractive elements). In addition, scatter distributions which can be realized using microlens arrays are greatly limited with respect to their shape and intensity distribution. They are typically restricted to the illumination of geometrically simple shapes such as rectangles or circles.

Volume holograms or so-called effective medium CGHs represent a further possibility, whose manufacture is very complex and/or expensive and which can be replicated or copied like surface-structured optics by demolding, injection processes or stamping processes and which moreover only work as desired for a narrow wavelength range.

It is therefore the object of the invention to provide possibilities with which a luminance uniform over a surface or a locally directly influenced scattering behavior of electromagnetic radiation directed onto an optical element can be reached and with which a direct locally limited imaging of the radiation source with the zeroth order of diffraction can be avoided or at least reduced in intensity.

An optical element diffusely scattering electromagnetic radiation in accordance with the invention can be formed from a material transparent for the electromagnetic radiation and can be adapted for electromagnetic radiation from the wavelength spectrum of the light.

A surface profile which does not form a repeating regular surface structure is present at a surface.

In this respect, elevated portions are formed as structural elements of the surface structure which have a height at which a peak deviation $\Delta\varphi$ is achieved which is larger than two-and-a-half times as much as the largest wavelength used.

The elevated portions have a lateral extent in a respective one plane in all axial directions which is larger than five times the largest wavelength used.

The individual elevated portions are continuously formed in the three spatial directions and in this respect no edges, steps, fissures and also no profiles are formed at the elevated portions.

No contour regions which change steadily constantly such as would be the case, for example, with curved surfaces of lenses or planar surfaces of prisms may be present at elevated portions. There should also not be any elevated portions present in the form of a second order surface and the first derivative of the surface profile should not be continuous.

The height of elevated portions should be understood as the distance between the position at which an elevated portion is furthest apart from the lowest point of a recess formed next to the elevated portion.

The lateral extent should in this respect be so large in all axial directions, that is by 360° about the center of area of the largest cross-sectional surface of an elevated portion as five times the largest wavelength used by which the element is irradiated.

A continuous configuration in the three spatial directions is to be understood as a non-symmetrical design or as a geometrical design with which the surface changes continuously from one position to any adjacent position and there are therefore no edges, steps, fissures or a profiling. However, where possible, no constantly maintained angles of inclination or a surface contour following a radius should occur in the three spatial directions (x, y and z directions) despite a constantly chaining contour along the surface. The angle of inclination or of curvature along the surface should not be the same or should not change uniformly, but should not change abruptly. This differs from the known microlenses in which the increase changes abruptly at boundaries between microlenses arranged next to one another.

In the invention, the geometrical design and dimensioning of each individual elevated portion should be calculated by means of a deterministic calculation algorithm and no random formation of elevated portions should thereby occur.

When collimated electromagnetic radiation is used, an element in accordance with the invention has an advantageous effect. A collimated laser beam can thus, for example, be directed to the surface at which the surface profile is formed. A considerably larger surface can be illuminated or appear lighted due to the scatter effect which can be achieved than the surface of the beam cross-section of the laser beam allows to be expected. The punctiform laser beam source is not visible or is only visible very unclearly or is imaged in this manner due to the possible avoidance or suppression of the zeroth order of diffraction.

It can also be favorable that no elevated portion of the surface structure has the same geometrical design and/or height and/or a volume which corresponds to a further elevated portion of the surface structure of the element. Every single elevated portion can thus be individually geometrically shaped and dimensioned. In this respect, the respective angle of incidence of the electromagnetic radiation, the respective desired angle of deflection α of the radiation, its position, the size or the spacing of an eye box, the wavelength spectrum used or a selected wavelength of electromagnetic radiation considering the optical refractive index of the material from which an element in accordance with the invention is taken into account can be taken into account in the design of the surface structure to be formed for every elevated portion. A complete asymmetry can be achieved using the individually designed and dimensioned elevated portions.

There is, however, also the possibility of arranging elevated portions of the same design or of a similar design in a homogeneous distribution over the irradiated surface or in specific regions of the irradiated surface. Locally directly determined optical effects can be utilized with the last-named arrangement, which can relate to a specific color impression in such a region, for example.

With individually designed and dimensioned elevated portions, different distances from the highest points of elevated portions respectively arranged next to one another result since the base surfaces of elevated portions are designed respectively differently and laterally different extents/lengths of these base surfaces, which are predefined by the lowest points of a recess formed bout an elevated portion, in the possible axial directions.

An element in accordance with the invention can be designed for a wavelength spectrum in the range between 200 nm and 1200 nm.

An element in accordance with the invention can have a predefinable scatter distribution in a wavelength range which is larger than ±3% of a central wavelength of the wavelength spectrum used. This is advantageous since with diffractive elements a large zeroth or higher order of diffraction is already formed at a very small deviation from the wavelength for which they have been produced.

The scatter distribution of the electromagnetic radiation used can change in dependence on the position of the incidence of the electromagnetic radiation (light) of the radiation source on the element, for example by a tilting of the center of gravity of the scatter distribution.

The manufacture can take place by methods known per se in which a locally targeted material removal takes place, but also by demolding, (injection) molding, (injection) embossing from a tool.

The invention starts from the already described diffractive diffusers. The existence of the zeroth order of diffraction and the wavelength dependence of these elements is based on the existence of discontinuities in the surface profile which occur as a result of 2π jumps in the phase function of the optical function. The amount of these jumps can, however, be precisely adjusted only or one wavelength and for a material of an optical element with a constant optical refractive index.

The phase φ can in this respect be approximately determined as a quotient of the product of the thickness or of the height of a structural element (elevated portion) h using the difference of the optical refractive indices between the material of the elements and of the environment Δn, divided by the respective wavelength λ. The thickness or height h accordingly has an influence on the achievable phase jump φ. Jumps in the phase function have an effect as with an optical diffraction grating.

In this respect, the radiated angular distribution scales in accordance with the grating equation with the wavelength λ and the occurring periods p and the order of diffraction m.

$$\sin\alpha = \frac{m \cdot \lambda}{p}$$

Very large spatial frequencies arise in the surface profile, which can practically not be realized in the production of diffractive elements due to the flank of the recess. This results in a rounding of the edges and in a shape deviation of the phase function, which would disadvantageously impair the scatter distribution with respect to homogeneity and efficiency. These and other errors in the surface profile caused by production have this effect.

In addition, points at which the phase φ is not defined arise at some positions of the optical function in conventional iterative Fourier transform algorithms (IFTAs) which are used for the design of conventional elements. These so-called phase dislocations, likewise production-induced, lead to unwanted scattered light and transmission in the direction of the zeroth order of diffraction, which is even amplified with a broadband illumination with electromagnetic radiation from a larger wavelength range. It is moreover not possible due to the existence of phase dislocation to transfer the optical function which was calculated by a conventional IFTA into a continuous surface profile which does not include any 2π phase jumps.

A modification of an IFTA was utilized in the invention in which no phase dislocations occur. For this purpose, it is not the phase function which is optimized in the developed design algorithm, but rather the surface profile directly with the size and height of elevated portions of the optical element produced later. During the iteration, differences which occur in the phase function are determined; they are also smoothed in an intermediate step and optionally scaled. This phase difference is locally added over a plurality of iterations and is converted into a height difference. In this respect, the absolute height of the surface modulation can also be set such that the resulting phase difference is substantially larger than 2π. The wavelength dependence of the surface structure is admittedly maintained, which results in a greater deflection of the electromagnetic radiation as the wavelength λ increases with the same grating period. However, the height of the peak deviation Δφ, caused by the surface profile, is scaled inversely proportionally to the wavelength λ.

The rule applies:

$$\sin\alpha = \frac{\lambda}{p} \Leftrightarrow \varphi = \frac{h \cdot \Delta n}{\lambda},$$

where P is the period number and α is the angle at which the electromagnetic radiation is deflected.

With an increasing height of an elevated portion, this results in an apparent growth of the 2π grating period for larger wavelengths and thus in an increasing compensation of both effects. This effect is shown for two wavelengths in FIG. 3. Due to the shorter wavelength of the green light (upper curve), it undergoes a greater phase delay Δφ when passing through the surface structure. If the occurring periodicity in the phase function of the optical wave is considered for a flank in the surface profile, a shorter period is found in the case of the shorter wavelength. The structure can be optimized in this case such that the angle of the deflection α remains approximately the same for both wavelengths. An achromatic scatter distribution can thus be realized in certain limits. The lower curve shows the extent for red light.

The IFTA used is a design algorithm with which the surface profile of the diffusely scattering element can be calculated for a desired target distribution (either an angular distribution, or an intensity distribution on a projection surface/screen or at a specific distance), the surface profile reaching the desired distribution while taking account of the properties of the electromagnetic radiation used. The target distribution can in this case be defined in that the desired intensity of the electromagnetic radiation is predefined in a specific angular range or for specific positions on a projection surface/screen.

Figure 4:
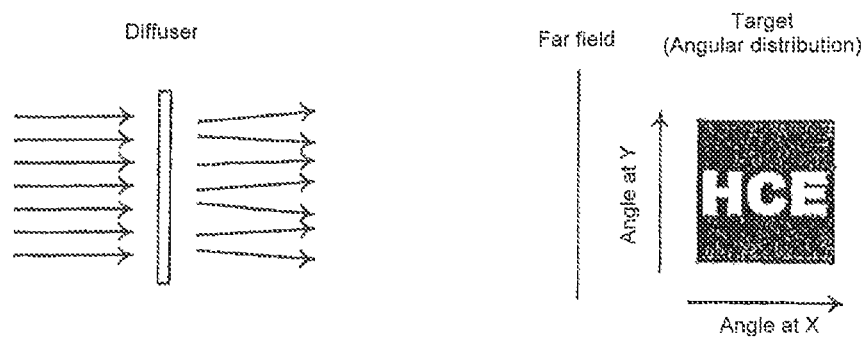
Figure 4:
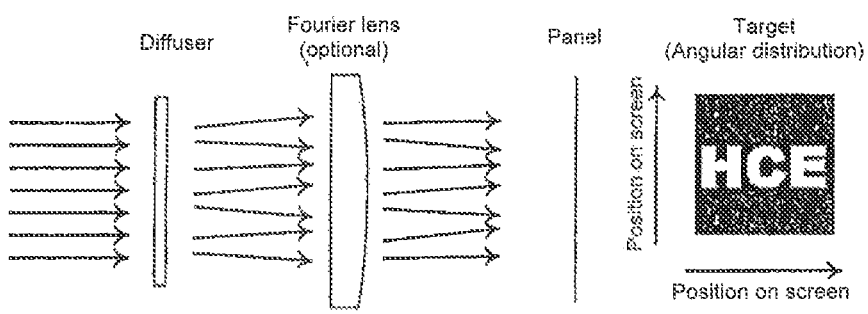
Figure 4:
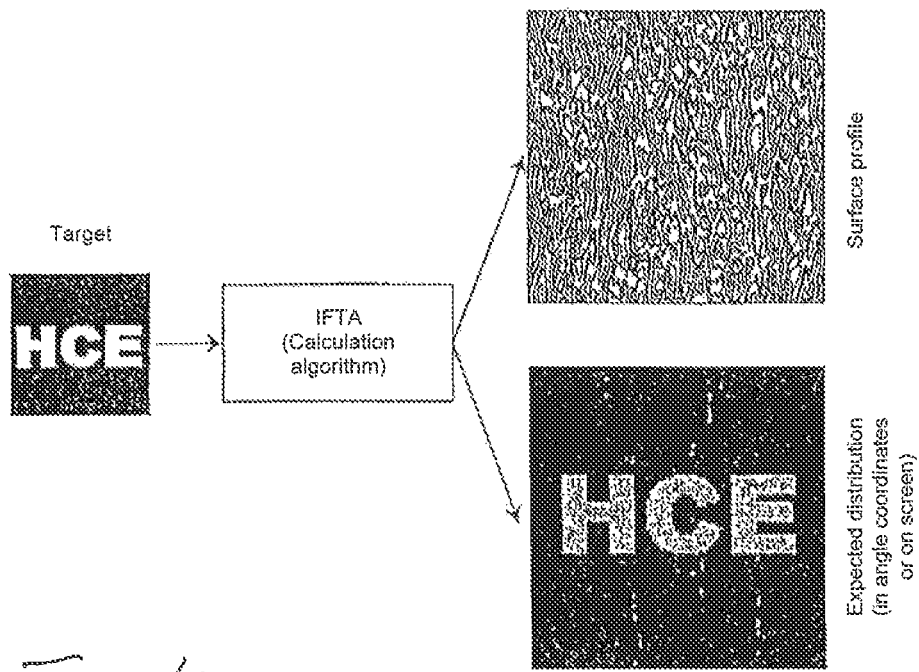

This state of affairs is shown in FIG. 4. Two scenarios are sketched by way of example in which a specific angular distribution, in the example the letters "HCE", is generated for a collimated light source. An optical lens can be used, for example, to transform this angular distribution into a spatial distribution on a projection surface/screen. This lens function could, however, also be integrated into a diffusely scattering element in accordance with the invention so that a sharp image is imaged directly on a projection surface/screen. If an element in accordance with the invention is calculated for an angular distribution in the far field, the image so-to-say arises on an infinitely far remote screen, in this respect, an element in accordance with the invention is designated by "diffuser" in FIG. 4.

If, for example, a divergent radiation source is used, a lens function could be integrated into a diffusely scattering element in accordance with the invention to collimate the radiation or to generate a desired scatter distribution such that locally different angles at which the radiation is incident onto the element can be compensated by a laterally different configuration of the element.

The optical elements in accordance with the invention can be used such that they are transparent for the respective electromagnetic radiation. They can also reflect the electromagnetic radiation. For this purpose, the surface having the surface profile or the surface remote from this surface can be provided with a reflective coating.

As initially described, energy in the zeroth order of diffraction is caused by a series of effects with diffractive optical elements. In this respect, the greatest effect is that higher wavelengths do not contain the required peak deviation Δφ of 2π and non-defined jumps occur in the phase function at lower wavelengths. Furthermore, due to the technical production limitation of the flank steepness of the surface of elevated portions of the surface profile, an error occurs in the recess and at positions of phase dislocations. Due to the shape deviation, scattered light and an amplification of the zeroth order of diffraction can likewise arise. The described effects are avoided in the invention since no jumps occur. The existence of energy in the zeroth order of diffraction can thus be suppressed almost completely and over a broad band. A radiation source as such is no longer visible in a punctiform manner. Its imaging is, however, at least attenuated so much that it is almost not visible for a viewer.

The size of the occurring spatial frequencies in the structure is reduced by the realization of deeper structures in which elevated portions have a greater eight over a starting base, whereby the minimum size of the surface modulations to be structured is increased. In comparison with conventional diffractive elements, a radiation into larger angular regions can thus be realized with a comparable production technology. In addition, effects which change the surface shape of the target profile during the production process can be taken into account and compensated in the design, which makes possible an exact definition of the scatter distribution of the electromagnetic radiation.

A broadband effect of the scatter function can be set over the increased total depth of the element or over the height of elevated portions. The described elements can in this respect be used for the total visible spectrum of electro-agnetic radiation and optionally furthermore up to NIR or even IR radiation.

No periodic repetitions occur with the surface structure formed in accordance with the invention. Unlike with lens arrays, the occurrence of unwanted diffraction patterns can therefore be almost completely avoided. This further-ore provides the advantage in the case of digital projectors that patterns or Moiré effects do not occur. They are caused when the periodic substructure of a screen superpose similar periods, for example, the regular pixel pattern of the projected image.

Asymmetrical scatter distributions can also be realized by the direct introduction in the surface profile of flanks at elevated portions. Care must be taken in this respect that the orientation of the introduced flanks is varied as statistically as possible from 0°-360° over the element and that the surfaces delimited by the flanks are contiguous, are of a similar size and are bounded in a polygonal or curvilinear manner. The scatter which arises due to the flanks can be integrated into the target scatter function, with the position and the orientation of the flanks being able to be calculated or taken into account.

In the event that an asymmetry is to be varied spatially over the usable surface of the optical element, any desired optical functions can be used for the local tilting of the orientation of the light flow (locally targeted variation of the deflected radiation), whereby lens functions and similar can be integrated into elements in accordance with the invention.

Regions can thus be formed in the surface structure by which a locally targeted deflection of the electromagnetic radiation can be achieved.

An application for head-up displays can thus become possible, for example, with a lens function integrated into the element. A collimation of the electro-agnetic radiation is thus, however, also possible, or as shown in FIG. 4, a uniform imaging at short distances is possible.

It is thereby additionally possible to ensure that different regions on the element scattering the electromagnetic radiation scatter into the same eye box. This is in particular relevant when the lateral extent of the element relative to the viewer gains in importance, whether due to the proximity of the viewer to the element or due to the large planar extent of the element. In applications in which the element is used in an intermediate image plane of an optical system, a spatially varying tilting of the main rays can be set using corresponding deflection angles. A field lens can thus be realized, for example.

In the case of conventional diffractive elements, the illuminated surface is overshadowed by recesses with oblique illumination/irradiation so that these elements typically have to be illuminated in an almost perpendicular manner.

With the elements in accordance with the invention, overshadowing effects re much lower depending on the aspect ratio of the structural elements of the surface structuring so that they can also be used under oblique illumination/irradiation.

A peak deviation of considerably more than $2\pi$ can be achieved using an element in accordance with the invention and its scatter distribution, is extremely defined, is asymmetrical and is characterized by high modulation or edges. In addition, a function independent of the wavelength can be achieved without the existence of a zeroth order. The proportion of the radiation of the zeroth order of diffraction which is not completely suppressed can at least be kept below 5%.

The invention will be explained in more detail by way of example in the following.

There are shown:

FIG. 1 a schematic view from above of an example of an element in accordance with the invention in which elevated portions are marked using contour lines and the lines shown dashed indicate a eight of $2\pi$ for a wavelength of 550 nm.

Figure 2:
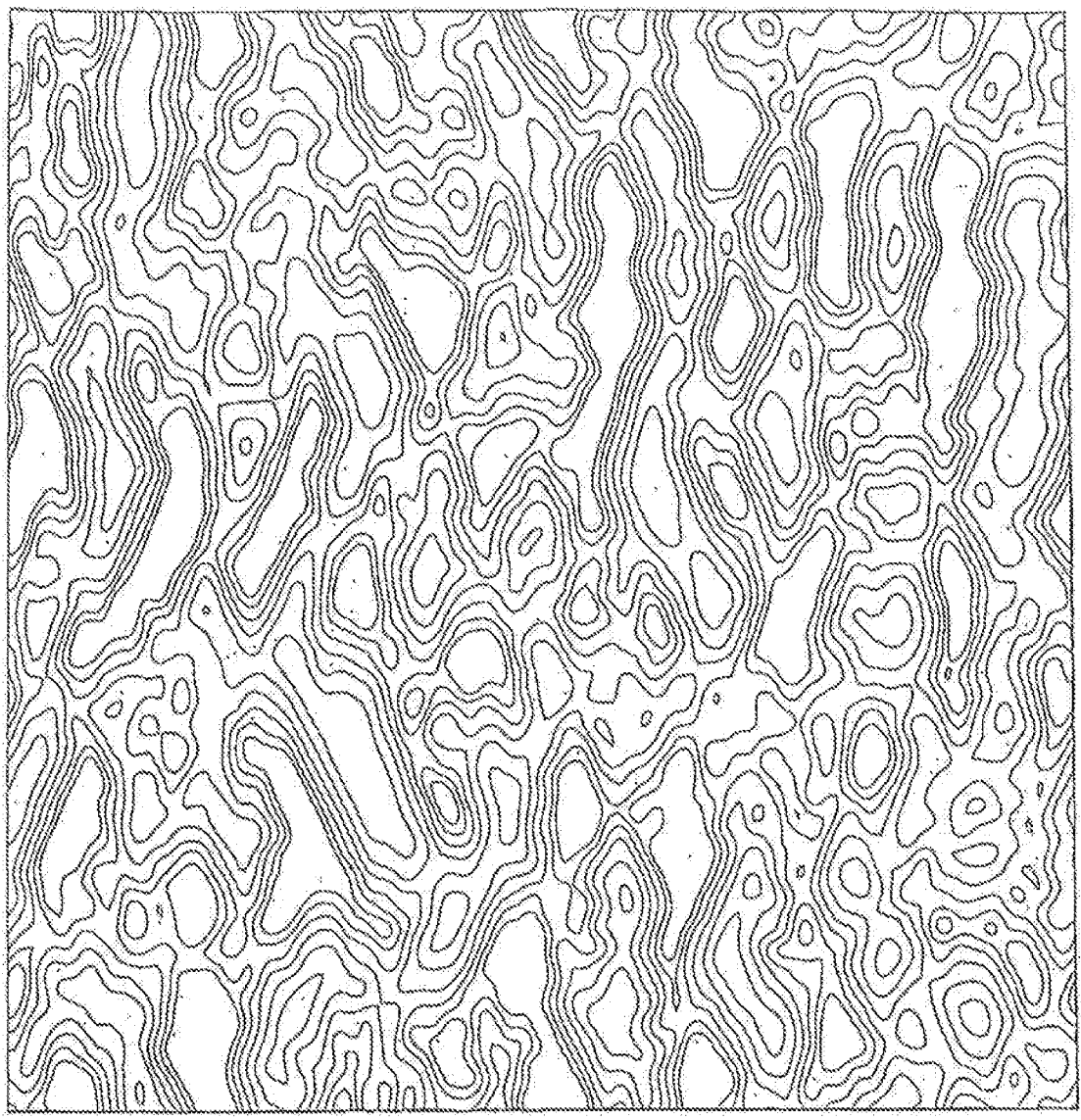

FIG. 2 a plan view in a schematic representation at a smaller scale; and

Figure 3:
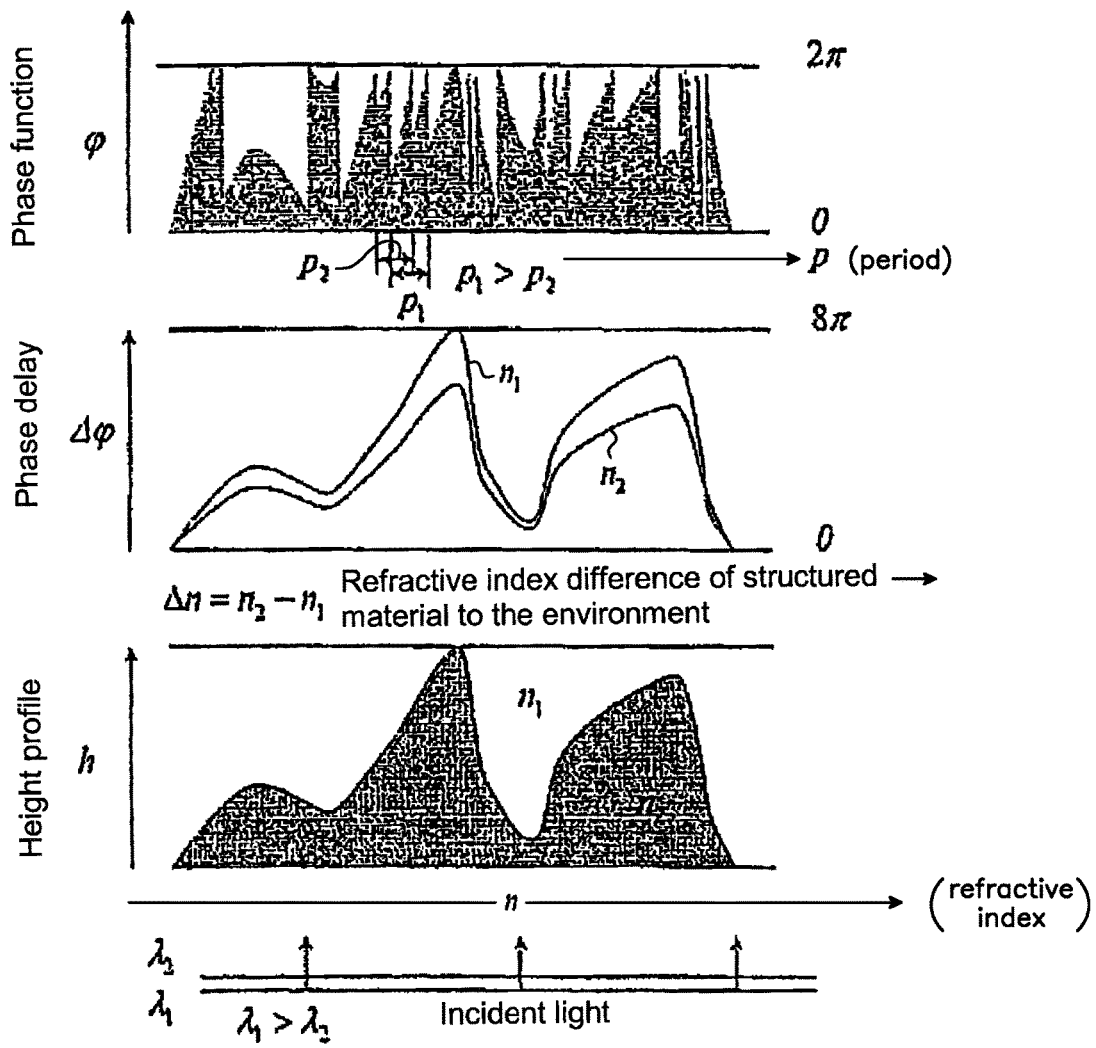

FIG. 3 diagrams with which the phase delay in an optically scattering element is to be illustrated.

It can be clearly recognized by the two representations of FIGS. 1 and 2 that elevated portions are individually designed and dimensioned. It can be recognized from the contour lines that no sharp edges or steps or abrupt upward jumps are present at the elevated portions. The contour lines form closed curve-like extents and no changes of direction occur which would include an angle <5. A constant change of the increase at the curved/arched surfaces of elevated portions should be maintained.

FIG. 4 shows by way of example possibilities of use of a diffusely scatter-ng element in accordance with the invention.

In this respect, a predefined angular distribution/intensity distribution is realized in the far field or an intensity distribution on a projection surface/screen at a specific distance from the element while taking account of the properties of the electromagnetic radiation of the source. The surface profile is calculated from the desired angular distribution by means of the IFTA design algorithm. The desired angular distribution is in this respect mostly not exactly reached, but can be reached in a good approximation and with a high efficiency.

The invention claimed is:

1. An optical element for diffusely scattering electromagnetic radiation comprising,
    a surface having a surface profile which does not form any repeating regular surface structure, wherein said surface profile is configured such that a zeroth order of diffraction is avoided or is suppressed with a proportion below 5%,
    said surface including individual elevated portions, each individual elevated portion,
    having a height at which a peak deviation $\Delta\phi$ is achieved which is greater than two-and-a-half times a largest wavelength used to irradiate the optical element,
    having a lateral extent in one plane in all axial directions, 360° about a center of said elevated portion, which is greater than five times said largest wavelength used to irradiate the optical element,
    being continuously formed in three spatial directions,
    having no edges, steps or jumps, and
    presenting no second order surfaces.

2. The optical element of claim 1, wherein said surface having said surface profile is coated with a reflective coating.

3. The optical element of claim 1, wherein collimated electromagnetic radiation is receivable on said surface.

4. The optical element of claim 1, wherein no elevated portion of said surface structure has a geometrical design and/or height and/or a volume of another elevated portion.

5. The optical element of claim 1, wherein said optical element is adapted for a wavelength spectrum in a range between 200 nm and 1200 nm.

6. The optical element of claim 1, wherein said optical element has a predefinable scatter distribution in a wavelength range which is larger than ±3% of a central wavelength within the wavelength range used to irradiate.

7. The optical element of claim 1, wherein said elevated portions have no contour regions which change steadily constantly.

8. The optical element of claim 1, said optical element for scattering electromagnetic radiation from a wavelength spectrum of visible light.

9. The optical element of claim 1, said optical element formed from a material which is transparent for the electromagnetic radiation in the wavelength spectrum used to irradiate the optical element.

10. The optical element of claim 1, wherein said surface structure includes regions for achieving a locally targeted deflection of electromagnetic radiation.

11. The optical element of claim 1, wherein each individual elevated portion has a geometrical design and dimensioning defined by a deterministic calculation algorithm.

12. A method of manufacturing an optical element for diffusely scattering electromagnetic radiation, said optical element including,
- a surface having a surface profile which does not form any repeating regular surface structure, wherein said surface profile is configured such that a zeroth order of diffraction is avoided or is suppressed with a proportion below 5%,
- comprising calculating said surface structure such that individual elevated portions are formed, each individual elevated portion,
  - having a height at which a peak deviation $\Delta\phi$ is achieved which is greater than two-and-a-half times a largest wavelength used to irradiate the optical element,
  - having a lateral extent in one plane in all axial directions, 360° about a center of said elevated portion, which is greater than five times the largest wavelength used to irradiate the optical element,
  - being continuously formed in three spatial directions,
  - having no edges, steps or jumps, and
  - presenting no second order surfaces.

13. The method of manufacturing as claimed in claim 12, wherein said surface profile is formed with locally targeted material removal by demolding, injection molding, or injection embossing from a tool.

14. The method of manufacturing as claimed in claim 12, wherein said calculating is carried out using an iterative Fourier transform algorithm.

* * * * *